United States Patent
Lundh et al.

(10) Patent No.: US 8,315,644 B2
(45) Date of Patent: Nov. 20, 2012

(54) ENHANCED FLOW CONTROL IN A CELLULAR TELEPHONY SYSTEM

(75) Inventors: Peter Lundh, Skärholmen (SE); Carola Faronius, Järfälla (SE); János Farkas, Kecskemét (HU); Sándor Rácz, Cegléd (HU); Szilveszter Nádas, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 520 days.

(21) Appl. No.: 12/516,534

(22) PCT Filed: Nov. 28, 2006

(86) PCT No.: PCT/SE2006/050511
§ 371 (c)(1),
(2), (4) Date: Apr. 19, 2010

(87) PCT Pub. No.: WO2008/066430
PCT Pub. Date: Jun. 5, 2008

(65) Prior Publication Data
US 2010/0203893 A1 Aug. 12, 2010

(51) Int. Cl.
*H04W 72/00* (2009.01)
(52) U.S. Cl. ............... 455/453; 455/422; 455/452.1; 370/235
(58) Field of Classification Search .......... 455/453, 455/522, 450, 452.2; 370/232, 233, 234, 370/235
See application file for complete search history.

(56) References Cited

U.S. PATENT DOCUMENTS

| | | | | |
|---|---|---|---|---|
| 6,519,461 | B1 * | 2/2003 | Andersson et al. | 455/453 |
| 6,671,512 | B2 * | 12/2003 | Laakso | 455/453 |
| 7,146,175 | B2 * | 12/2006 | Rune et al. | 455/453 |
| 7,787,492 | B2 * | 8/2010 | Timus et al. | 370/468 |
| 2003/0189934 | A1 | 10/2003 | Jeffries et al. | |

(Continued)

FOREIGN PATENT DOCUMENTS

CN 1671226 9/2005
(Continued)

OTHER PUBLICATIONS

Communication pursuant to Article 94(3) EPC; European Patent Application No. 06 82 4580.2 dated Nov. 14, 2011; 5 pages.

(Continued)

*Primary Examiner* — Temica M Beamer
(74) *Attorney, Agent, or Firm* — Myers Bigel Sibley & Sajovec, P.A.

(57) ABSTRACT

The invention discloses a method (200, 300, 400) for traffic control in a cellular telephony system (100) comprising a number of cells, each cell comprising at least one Radio Base Station, RBS, (170). The system (100) comprises at least one Radio Network Controller, RNC, (110 130 150), for the control of a number of Radio Base stations. The traffic between an RBS and an RNC comprises a number of flows. The invention is intended for the control of flows from the Radio Base Stations to their RNC. The method uses one control function for each flow from each of said Radio Base Stations, and also comprises a congestion detection function (220) which detects the presence or absence of congestion in the traffic from an RBS to an RNC, and which, upon detection of congestion reduces the bit rate of the congested traffic, and in the absence of congestion, increases the bit rate of the previously congested traffic.

20 Claims, 4 Drawing Sheets

U.S. PATENT DOCUMENTS

2004/0160914 A1  8/2004  Sarkar

FOREIGN PATENT DOCUMENTS

| GB | 2 403 378 A | 12/2004 |
| WO | WO 02/052886 A1 | 7/2002 |
| WO | WO 2005/107187 A1 | 11/2005 |
| WO | WO 2006/075951 A1 | 7/2006 |

OTHER PUBLICATIONS

Communication with Supplementary European Search Report, European Application No. 06 82 4580.2, Aug. 9, 2011; 4 pages.

"3$^{rd}$ Generation Partnership Project; Technical Specification Group Radio Access Network; Iub/Iur congestion control (Release 7)", 3GPP Standard; 3GPP TR 25.902, 3$^{RD}$ Generation Partnership Project (3GPP), Mobile Competence Centre; 650, Route Des Lucioles; F-06921 Sophia Antipolis Cedex, France, No. V7.0.0, Sep. 1, 2006, 14 pp. XP050369320.

Siemens: "E-DCH TNL Congestion Control with Soft Handover", 3GPP Draft; R3-060266, 3$^{RD}$ Generation Partnership Project (3GPP), Mobile Competence Centre; 650, Route Des Lucioles; F-06921 Sophia Antipolis Cedex, France, vol. RAN WG3, No. Denver, USA; 20060209, Feb. 9, 2006, XP050159211.

"3$^{rd}$ Generation Partnership Project; Technical Specification Group Radio Access Network; UTRAN Iub/Iur interface user plane protocol for DCH data streams (Release 7)" 3GPP Standard; 3GPP TS 25,427, 3$^{RD}$ Generation Partnership Project (3GPP), Mobile Competence Centre; 650, Route Des Lucioles; F-06921 Sophia Antipolis Cedex, France, No. V7.2.0, Sep. 1, 2006, 44 pp. XP050368712.

First Office Action corresponding to Chinese Patent Application No. 200680056475.6 dated Feb. 10, 2011; 26 pages.

English Translation—Decision on Rejection, Chinese Patent Application No. 200680056475.6, May 26, 2009.

\* cited by examiner

ENHANCED FLOW CONTROL IN A CELLULAR TELEPHONY SYSTEM

TECHNICAL FIELD

The present invention discloses a method for traffic control in a cellular telephony system, in which system there is a number of cells and least one node, a Radio Base Station (RBS), for the control of traffic to and from users in the cells. The system also comprises at least one node, a Radio Network Controller (RNC), for control of a number of Radio Base stations.

The present invention is primarily aimed at facilitating control of the traffic between an RBS and an RNC, and more specifically at the traffic from the RBS to the RNC.

BACKGROUND

In the 3G cellular telephony system known as WCDMA, (Wideband Code Division Multiple Access), the system is divided into cells, and has a number of Radio Base Stations (RBS) which monitor and control traffic to and from users (UE) in the cells. The node "above" the RBSs is known as the Radio Network Controller (RNC), with one of the functions of the RNC being to monitor and control the RBSs.

The traffic from the RBSs to the RNC can be expressed as a number of flows. Accordingly, the system needs to comprise a function for monitoring and controlling the flows from the RBSs to the RNC. The purpose of this monitoring and controlling is, inter alia, to control congestion over the interface between the RBSs and the RNC, and also over the interface between the RNC's in the system.

There are several possibilities for controlling such flows, depending on the cost of the transmission and the properties of the traffic. Such possibilities are e.g. so called "overprovisioning" or admission control, or a combination of those methods.

SUMMARY

As explained above, there is a need for an improved control function in a cellular telephony system for the traffic from RBSs to their RNC.

This need is addressed by the present invention in that it discloses a method for traffic control in a cellular telephony system, in which system there is a number of cells, with each cell comprising at least one node, a Radio Base Station (RBS), for the control of traffic to and from users in the cell.

The system in which the invention can be applied also comprises at least one node, a Radio Network Controller (RNC), for the control of a number of Radio Base stations. The traffic between an RBS and an RNC can comprise a number of flows, and the method of the invention is intended for the control of said flows from the Radio Base Stations in the system to their RNC.

The method comprises using one control function for each controlled flow from each of said Radio Base Stations. This control function comprises a congestion detection function which detects the presence or absence of congestion in the traffic from an RBS to an RNC, which upon detection of congestion reduces the bit rate of the congested traffic. In the absence of congestion, the control function increases the bit rate of the previously congested traffic.

Due to the fact that the invention discloses one control function for each controlled flow, a greater degree of tailoring and responsiveness may be obtained by means of the invention.

The invention is mentioned above as having one control function per each controlled flow since, conceivably, it may be desired in some systems to leave one or more flows outside of the control function of the invention. This can also be expressed as saying that one instance of the control function of the invention is used per each controlled flow.

The reduction of traffic is suitably carried out in a non-linear fashion, for example as an exponential reduction or as a step function.

The increase when there is no congestion detected can suitably be carried out in a linear fashion, but naturally also as in a non-linear fashion.

Suitably, the flow control function has one function which is located in the RNC, and one function which is located in the RBS. In a preferred embodiment, the congestion detection function is located in the RNC, and, if congestion is detected, a control frame indicating this is sent from the RNC to the RBS, and the RBS carries out the bit rate reduction.

As a preferred option, the control frame can only be sent if a previous such control frame has not been sent within a predefined first time interval, which will save processing resources in the RNC, and which will also give previous reduction a chance to take effect.

For the same reason, in a preferred embodiment, the control frame from the RNC can only be acted upon in the RBS if a previous such control frame has not been received within a predefined second time interval.

Also in a preferred embodiment, the increase of the bit rate from the RBS to the RNC is carried out if no control frame indicating congestion has been received from the RNC from the RNC within a predefined third time interval.

BRIEF DESCRIPTION OF THE DRAWINGS

The invention will be described in more detail in the following, with reference to the appended drawings, in which.

DETAILED DESCRIPTION

Figure 1:
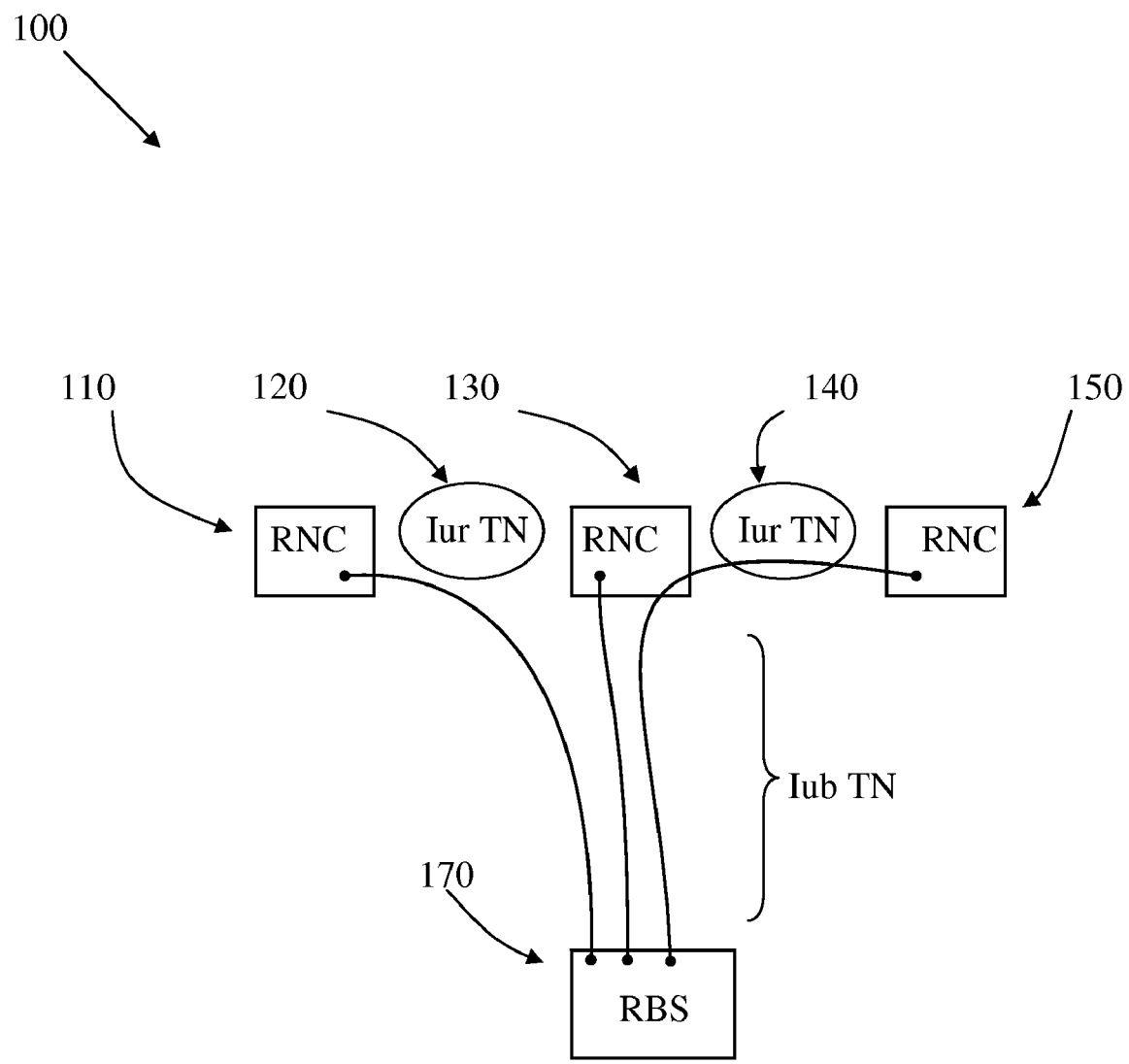
FIG. 1 shows an overview of a system in which the present invention may be applied.

FIG. 1 shows an overview of parts of a cellular telephony system 100 in which the present invention can be applied. The invention will in the following be described as being a WCDMA-system, but it should be understood that this is as an example only, the invention can be applied to more or less any cellular telephony system which comprises similar system components and functions.

In order to facilitate the understanding of the invention, all parts and components of the system 100 are not shown in FIG. 1, but only those parts and components which are the most relevant to the invention.

As shown in FIG. 1, the system 100 comprises a number of Radio Base Stations 170, one of which is shown. The RBS 170 monitors and controls traffic to and from at least one cell (not shown) in the system, and also communicates with the "next" node in the system, said node being a Radio Network Controller (RNC), a number of RNC's 110, 130, 150 being shown.

As explained previously, the traffic between the RBS and the RNC's can be expressed as a number of flows. Thus, in order to facilitate in the system, there must be a function for the control of these flows, in order to, for example, act when there is congestion in the system.

As can be realized from FIG. 1, the flows from the RBS to one or more of the RNC's can encounter bottlenecks, with different flows possibly encountering different bottlenecks in the system.

The present invention discloses a flow control method which, as opposed to previous such methods, operates on a per-flow basis, i.e. the invention uses one control function for each of said flows from each RBS.

Such per-flow regulation is beneficial for the control of flows that encounter different bottleneck in the network, and a per flow control function also enables the separation of the applied QoS (Quality of Service) solution from the flow control function.

The flow control function according to the invention will be described in detail below, but initially, a short introduction to the function of the invention will first be given:

The invention is aimed at controlling the flow from the RBSs to the RNC, a traffic which is known as the uplink direction or in some applications, Enhanced Uplink, EUL, or High Speed Uplink Packet Access, HSUPA.

The EUL Flow Control method of the invention, briefly, operates in the following way: Data frames, usually in the form of E-DCH (Enhanced Dedicated Channel) frames from flow controlled radio bearers are monitored in an EUL flow control block in the RNC.

Thus, the flow control block in the RNC is able to detect congestion in the interface between the RNC and the RBS, said interface being referred to as the Iub. If the flow control block of the RNC detects congestion, it sends a Transport Network Layer Congestion Indication (TCI) control frame to the RBS.

TCI control frames are not sent particularly often, in order to save processing resources in RNC and to allow previous bit rate reductions to take effect after congestion detection. For the same reason, the invention uses a timer in the RNC which regulates the minimum time interval between sending any two consecutive TCI frames to an RBS.

The RBS receives the TCI frame, and addresses the congestion by reduction of the rate in its EUL scheduling function by a certain predefined percentage.

There is another timer in the RBS that regulates the possible shortest time, i.e. a second time interval, between two bit rate reductions in the scheduler, which is used for the same reasons as the first time interval in the RNC, and also to facilitate interoperability with systems from different manufacturers.

If no congestion messages are received in the RBS for a certain time, i.e. a third interval, the scheduler in the RBS increases the bit rate in small predefined steps.

Figure 2:
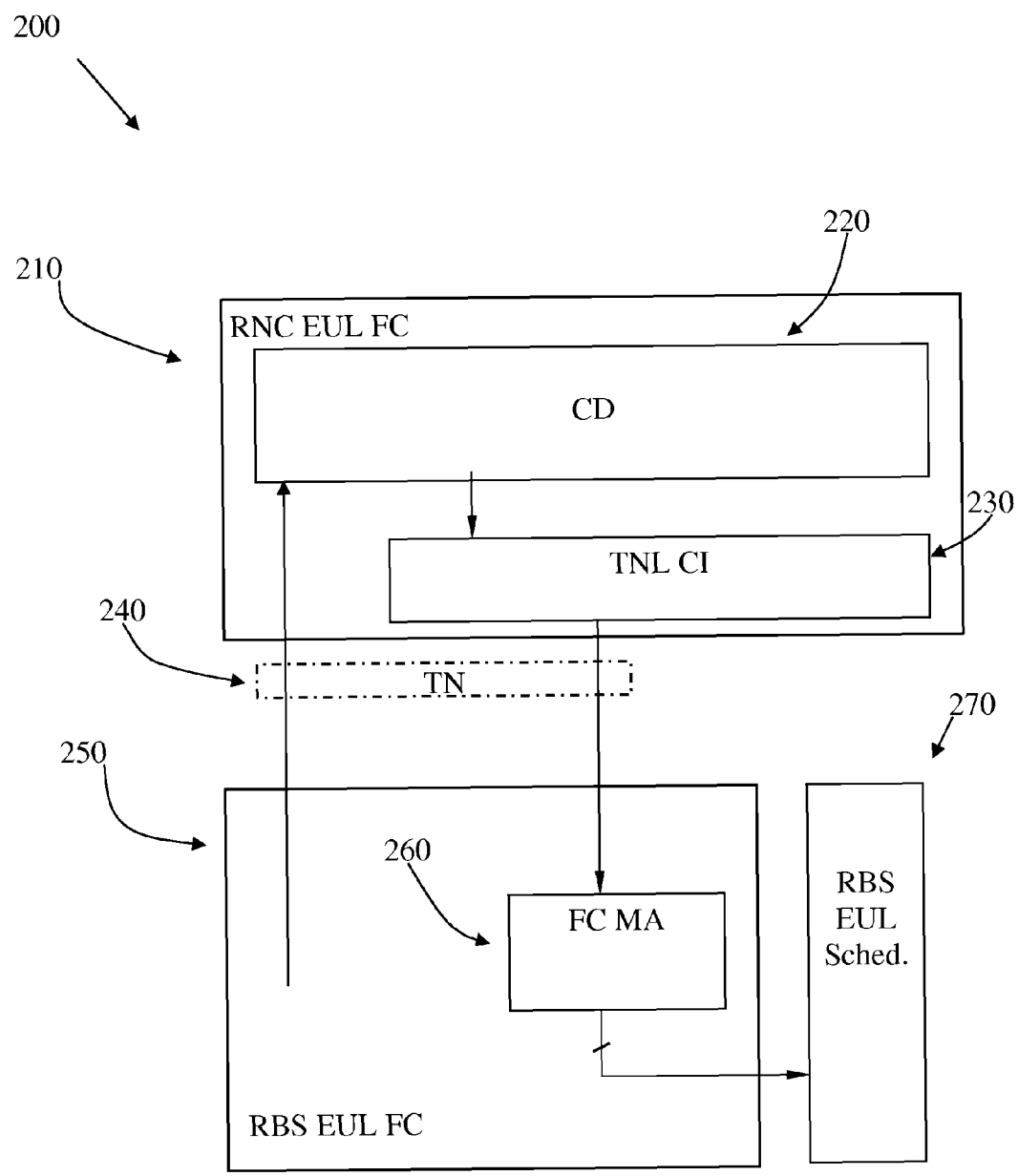
FIG. 2 shows some logical blocks which are included in a system which uses the invention.

In FIG. 2, a block diagram 200 gives an overview of the logical blocks of the EUL flow control function of the invention. It should be pointed out here that the flow control function of the invention works per flow, but the decision on whether or not a certain flow should be regulated by the flow control function comes from a QoS (Quality of Service) mapping functionality which, as such, is not part of the invention, and which is thus not described in more detail here.

As shown in the block diagram 200, the flow control function comprises functionalities both in the RNC and in the RBS. The functionality which is located in the RNC is shown as 210 in FIG. 2, and is in the following referred to as the RNC EUL flow control, indicated in FIG. 2 as RNC EUL FC.

The EUL flow control (EUL FC) block 210 in the RNC monitors the arrival of E-DCH data frames of the flow controlled flows which arrive via the Transport Network, TN, 240 of the system, and thus, the EUL FC block 210 can detect congestion in the transport network, 240. The Transport Network 240 comprises the interfaces Iur and Iub, interfaces which have been explained previously in this text.

The EUL FC uses one of two different indicators of congestion in the transport network, namely an increase in data delay and data frames which have been lost or destroyed, said indicators being checked by a special congestion detection function 220 in the EUL FC 210, indicated as CD in FIG. 2.

The loss of data frames can be detected by said function 210 by means of missing frame sequence number, and destroyed frames can be detected by checking the CRC of the header and of the payload.

An increase in data delay can be detected by a so called dynamic delay functionality in the Congestion Detection function 220 of the RNC EUL flow control 210. Dynamic delay is a measurement of the degree of buffer build-up in the transport network 240 between the RBS and the RNC for the E-DCH data frames.

The RNC EUL FC 210 comprises a sub-block 230, which receives a signal from the Congestion Detection Function 220 that congestion has been detected, and which then, via the TN 240, sends a congestion indication (TCI) control frame to the RBS for the affected flow. The sub block 230 is indicated in FIG. 2 as "TNL CI", TNL Congestion Indication.

In order to ensure a minimum time between bit rate reductions, the TCI intensity per flow controlled EUL flow is limited by a parameter which corresponds to a first predefined time interval, which is the minimum interval for sending TCI control frames from the RNC EUL FC to the RBS. In other words, said first time interval must elapse between two consecutive TCI messages are sent from the RNC EUL FC 210.

In a preferred embodiment, after the RNC EUL FC sends a TCI, Iub congestion detection is not needed to be evaluated during the next of said first time intervals. However, the Dynamic delay learning of what the shortest delay must be evaluated for every received E-DCH data frames.

As is also shown in the block diagram 200 of FIG. 2, the invention also comprises a functional block 250 located in the RBS, in other words a RBS EUL Flow Control, shown as "RBS EUL FC" in FIG. 2. The functional block 250 in the RBS in turn comprises a flow control main algorithm 260, shown as "FC Main" in FIG. 2, which has as its output a signal to the RBS EUL scheduler 270 regarding the bit rate, "reduce bit rate". The RBS EUL scheduler 270 as such is a known function in the RBS, and will therefore not be described in more detail here. It is indicated as "RBS EUL Sched." In FIG. 2.

Figure 3:
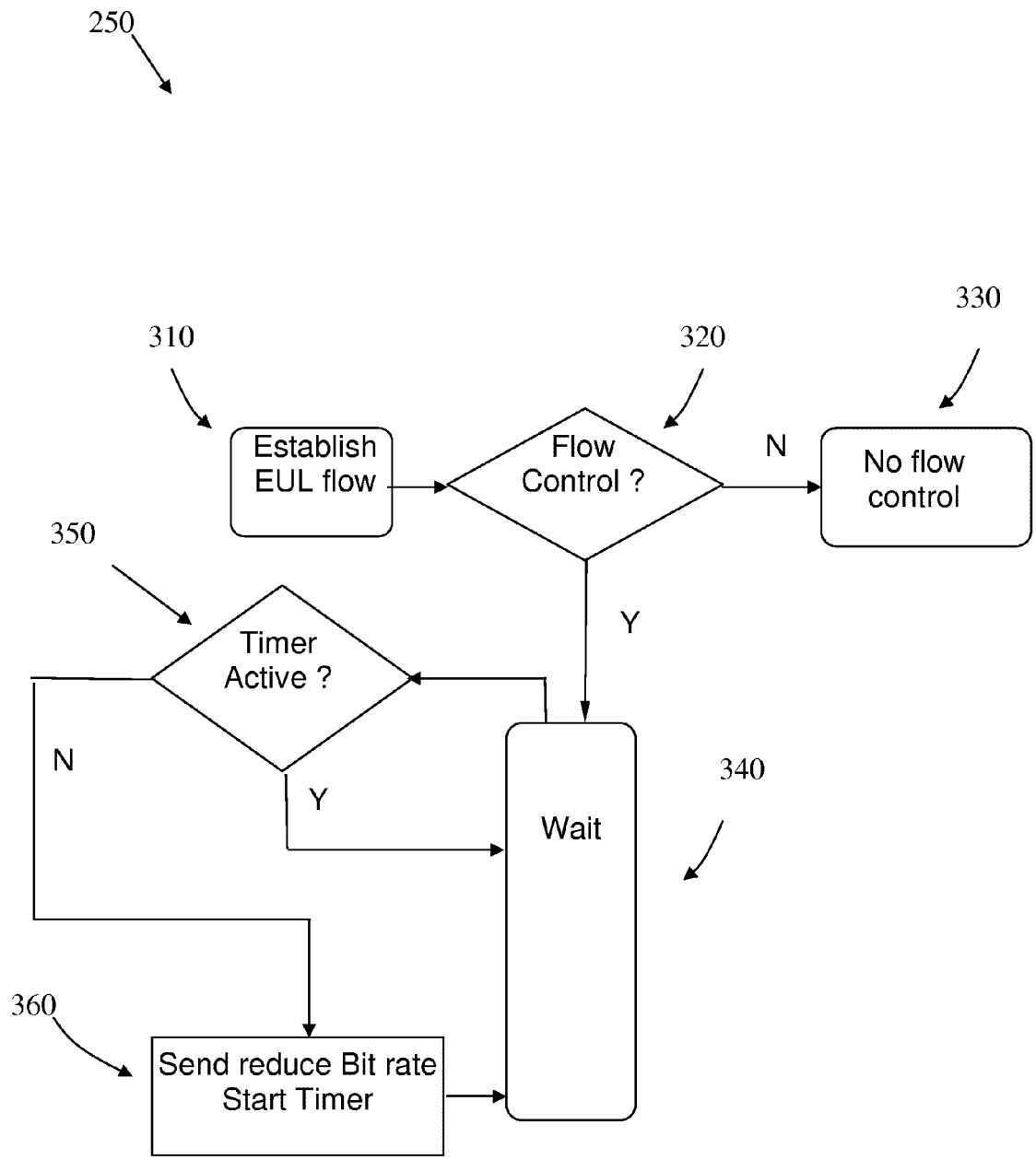
FIG. 3 shows a rough flow chart of the invention.

A more detailed description of the main algorithm 260 of the RBS EUL FC 250 will now be given with reference to FIG. 3, which shows a flow chart of the RBS EUL FC main algorithm 250. It should be pointed out that since the invention discloses a per flow control function, one instance of the algorithm according to the flow chart 250 is used for each flow controlled EUL flow.

As indicated in the flow chart 250, there is comprised in the function in the RBS a check 310 of whether or not the flow should be flow controlled. If the answer is YES, the function waits for TCI:s indicating congestion, from the RNC, block 340. When a congestion is indicated, the "prohibit timer" which is active during the time interval needed between two bit rate reductions in the RBS is checked. If the prohibit timer is not active, the bit rate is reduced with a certain percentage value, which is done by sending a message to the EUL scheduling function (not shown here, but shown as 270 in FIG. 2) in the RBS, see block 360. Said percentage value is a parameter that it is possible to vary, i.e. it can be made implementation dependent. It is thus the role of the RBS scheduler to carry out the actual bit rate reduction.

After a bit rate reduction, the prohibit timer is also started, see block 360, in order to prevent further bit rate reductions too close in time to the previous one. This timer regulates the possible shortest time between two consecutive bit rate reductions. The flow control method reduces the bit rate exponentially, e.g. with 10 or 50%. The reduction can also be in other non-linear ways, for example as a step function. Naturally, if this is suitable for the system, the reduction can also be a linear one.

The reduction is followed by a linear increase of the bit rate, suitably the same linear increase is used for all EUL FC flows in all RNC:s, said increase being a parameter to be defined. Naturally, the increase can also be non linear, if this is suitable in the system. As an example, in a particular embodiment, the linear bit rate increase is only carried out during a certain time period, following which the increase step can be non-linear, or it can be increased but still be linear. The control of this increase is, in this embodiment of the invention, controlled by the RBS EUL scheduler 270.

Some additional words can be said about the role of the RBS scheduler 270 as shown in FIG. 2: As described above, in the event congestion, the uplink bit rate reduction is performed as a real bit rate reduction over the EUL air-interface: The EUL Flow Control 250 signals a bit rate reduction to the RBS Scheduler 270 which then reduces the bit rate over the air-interface, by means of so called Absolute Grants or Relative Grants. Since these grants are well known to those skilled in the art, they will not be described in more detail here.

In a particular application, the invention is used in a system which has a so called "Soft Hand Over" function, which means that the E-DCH Radio Bearer, i.e. the originator of the traffic, can be in the Soft Hand Over state, meaning that the air interface E-DCH data frames may be received in several cells.

One of these cells is defined as the "Serving Cell", with the other cells thus being "non-served cells". This also means that there will be corresponding served and non served RBS:s.

In a system with served and non served RBS:s, a possible solution to the problem of congestion reduction would, according to the invention, be to "drop" some of the data frames in the non-served RBS:s, when the Iub Transport Network link is congested. These dropped data frames are never sent over the Iub interface, and will thus not trigger the Iub congestion detection algorithm in the RNC. There is still a high probability that the dropped data frames are also received correctly in the serving cell RBS, and sent to the RNC from there, since, according to the inventive principle, there is no dropping in the serving RBS:s.

The principle of the "dropping algorithm" is that after dropping a data frame, the algorithm will allow for sending a given amount of data, suitably expressed as an amount of octets. When that amount of octets has been sent, another frame must be dropped etc. An example of this principle is as follows: a 1000 octets long E-DCH data frame is dropped when the allowed forwarding ratio is 90% of the capacity, which allows for sending another 1000*0.9/(1−0.9)=9000 octets before a frame must be dropped again.

According to the invention, an extra margin can be provided for sending short E-DCH data frames, which allows for sending a few more short data frames before a long data frame must be dropped.

The non-serving cell dropping unit will, according to the invention, gradually recover from having a dropping rate to enter normal operation, without any commands or signals from other units. One way of carrying this out is to evaluate the flow controlled EUL flow in question with a pre-defined frequency, such as, for example, 100 ms, and see if the bit rate of the flow can be increased or not.

The default system behaviour is to send EUL air-interface ACK (Acknowledgement) messages for the dropped air interface data frames, but it is possible to send NACK (Negative Acknowledgement) messages as well. If NACK is used, it would be useful to have several HARQ (Hybrid Automatic Repetition Request) processes, as follows: if, for example, two HARQ processes are used, one of them could be used for the "best effort QoS" which is flow controlled, and the other for streaming QoS flows which are not flow controlled.

The NACK method would be that the scheduler answers with NACK when dropping data frames in RBS, i.e. for each NACK, the probability that the serving cell has detected it correctly increases, instead of sending ACK and then dropping the data frame in non-serving cell. Using several HARQ processes is mostly useful when using 2 ms TTI. (Transmission Timing Interval)

Also, a mix between non-serving cell NACKs and E-DCH frame dropping could be considered: It would be possible to first check the content of MAC-e, and based on the content decide to "DROP+NACK" (single flow), or "DROP a part of the content+ACK/NACK-whichever" (multiple flows, of which only one is congested). Most of the MAC-e PDUs will contain data from a single flow anyway (but not always). It would also be possible to favour single flow MAC-e frames when dropping, and thereby increasing the probability of being able to send NACK, when dropping.

Figure 4:
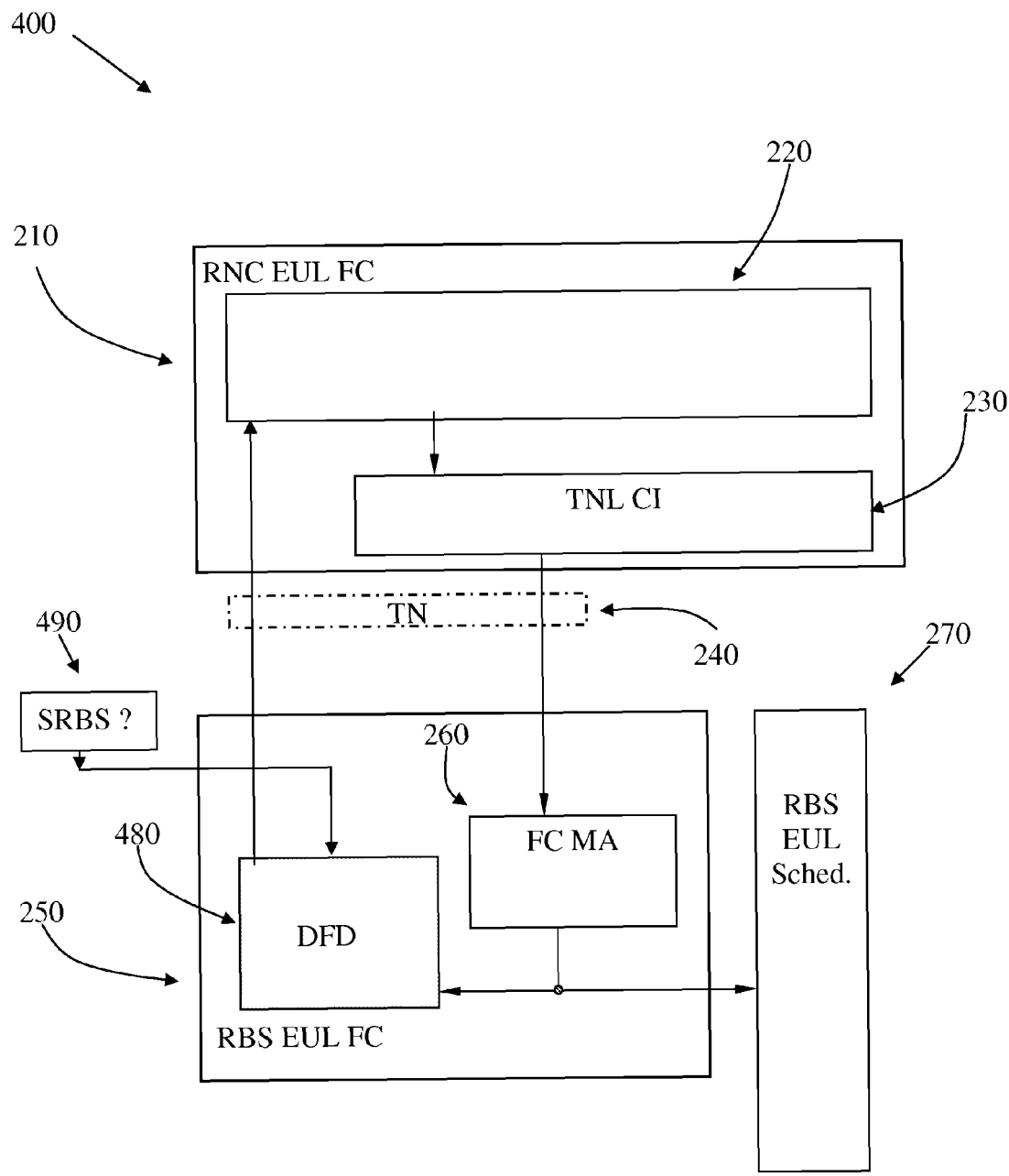
FIG. 4 shows the system of FIG. 2, with an expanded function.

FIG. 4 shows a block diagram 400 which is intended to give an overview of the logical blocks of the EUL flow control function of the invention with the "data dropping function". As can be seen, many of the blocks of FIG. 4 are similar to those shown in FIG. 2. Those blocks have been given the same reference numbers and names as in FIG. 2, and will not be explained again here.

However, in contrast to FIG. 2, the block diagram of FIG. 4 includes two more blocks in the RBS EUL FC. There is a function 490, SRBS, for detecting if the RBS is a serving RBS or not, which is used as input to a data frame dropping algorithm 480, DFD, in the RBS EUL the FC algorithm.

The data frame dropping algorithm 480 carries out at least the following functions:

Detect if the RBS is a serving or non serving RBS.

If the RBS is non serving, increase the dropping rate when a "reduce bit rate" signal is received from the FC main algorithm 260.

If the RBS is non serving, gradually decrease the dropping rate over time, to eventually become zero.

A more detailed description of the data frame dropping algorithm 480 has been given above, but a principle of the algorithm is that long E-DCH data frames will be preferred when choosing E-DCH data frames to drop.

In the dropping algorithm, there is an extra margin for sending short E-DCH data frames, which allows for sending a few more short data frames before a data frame must be dropped. The reason for this is that long data frames should be preferred when choosing frames to drop, as short data frames often contain control information (eg. Radio Link Control, RLC, or TCP ACK) messages, at least with a probability which is high enough to motivate an algorithm which distinguishes between short and long packets.

The invention claimed is:

1. A method for traffic control in a cellular telephony system, said cellular telephony system comprising a number of cells, each cell comprising at least one Radio Base Station, RBS, for the control of traffic to and from users in the cell, the cellular telephony system also comprising at least one Radio Network Controller, RNC, for the control of a number of Radio Base stations, in which cellular telephony system the traffic between an RBS and an RNC can comprise a number of flows, the method controlling said flows from the Radio Base Stations in the cellular telephony system to their RNC, the method comprising:

using one control function for each controlled flow from each of said Radio Base Stations, said control function comprising a congestion detection function, detecting, using the congestion detection function, a presence or absence of congestion in the traffic from an RBS to an RNC, upon detection of congestion, sending a control frame from the RNC to the RBS indicating detection of congestion to trigger the RBS to reduce, using the congestion detection function, a bit rate of the congested traffic, and subsequently in the absence of congestion, increasing, using the congestion detection function, the bit rate of the previously congested traffic, wherein the control frame is only sent from the RNC to the RBS to indicate detection of congestion if a previous such control frame has not been sent from the RNC to the RBS within a predetermined first time interval.

2. The method of claim 1, where said reduction or said increase of traffic is carried out in a non-linear fashion.

3. The method of claim 1, where the flow control function has one function which is located in the RNC and one function which is located in the RBS.

4. The method of claim 3, where the congestion detection function is located in the RNC.

5. The method of claim 4, where, if congestion is detected, a control frame indicating detection of congestion is sent from the RNC to the RBS, and the RBS carries out said bit rate reduction.

6. The method of claim 1, where the control frame from the RNC is only acted upon in the RBS if a previous such control frame has not been received from the RNC within a predefined second time interval.

7. The method of claim 6, where the increase of the bit rate from the RBS to the RNC is carried out if no control frame indicating congestion has been received from the RNC within a predefined third time interval.

8. The method of claim 7, where the increase of the bit rate is limited by a predefined speed increase per a predefined time interval, following which interval the increase is carried out without said limitation.

9. The method of claim 1, where, in response to the RBS receiving a control frame indicating that there is traffic congestion and the RBS being a "non serving" RBS, the RBS drops some data from being sent to the RNC.

10. The method of claim 9, where the RBS gives preference to dropping long data packets instead of dropping short data packets.

11. The method of claim 10, where the RBS allows a certain amount of data to be sent after data has been dropped.

12. A Radio Network Controller, RNC, for use in a cellular telephony system, said RNC comprising a component for controlling a number of Radio Base Stations, RBS, in said cellular telephony system, the RNC being able to receive traffic from the RBSs in the system in a number of flows, the RNC comprising:

a component for monitoring the flows from the RBSs to the RNC, and a component for controlling the flows from the RBSs to the RNC, the component for monitoring the flows and the component for controlling the flows are used to monitor and control each of said controlled flows from each RBS to the RNC, the component for monitoring the flows comprising:

a congestion detection function which detects a presence or absence of congestion in each of said controlled flows, and where the component for controlling the flows of the RNC being to send a control frame from the RNC to the RBSs indicating detection of congestion to trigger the RBSs to reduce, using the congestion detection function, a bit rate of the congested traffic, and subsequently in the absence of congestion, increase, using the congestion detection function, the bit rate of the previously congested traffic, and where the control frame is only sent, by the component for controlling the flows of the RNC, to the RBSs to indicate detection of congestion if a previous such control frame has not been sent within a predetermined time interval.

13. The RNC of claim 12, where the congestion detection function detects congestion by detecting that data which should have been received has been lost.

14. The RNC of claim 12, where the congestion detection function detects congestion by detecting an increase in data delay from one or more RBS.

15. A Radio Base Station, RBS, for use in a cellular telephony system, in which cellular telephony system there is at least one Radio Network Controller, RNC, for monitoring and control of RBSs in the cellular telephony system, said RBS comprising:

a control function which controls the traffic flows from the RBS to the RNC, where one instance of the control function acts on each of said controlled flows from the RBS to the RNC, a component for receiving congestion detection messages from the RNC, a component for reducing a bit rate of congested traffic upon reception of a congestion detection message, a component for detecting an absence of congestion, and a component for increasing the bit rate of the previously congested traffic upon detection of the absence of congestion, wherein said increase is initiated if no congestion indication messages have been received from the RNC within a third predefined time interval.

16. The RBS of claim 15, where said reduction is only carried out once per each of a second predefined time interval.

17. The RBS of claim 16, where said reduction or said increase of traffic is carried out in a non-linear fashion.

18. The RBS of claim 15, further comprising:

a component for detecting if the RBS is a "non serving" RBS, and a component for ensuring that if the RBS is "non serving" and if the RBS receives a control frame indicating that there is traffic congestion, the RBS drops some data from being sent to the RNC.

19. The RBS of claim 18, additionally comprising:

a component for ensuring that the RBS gives preference to dropping long data packets instead of dropping short data packets.

20. The RBS of claim 19, further comprising:

a component for ensuring that the RBS allows a certain amount of data to be sent after data has been dropped.

* * * * *